US008634352B2

(12) United States Patent
Smith et al.

(10) Patent No.: US 8,634,352 B2
(45) Date of Patent: Jan. 21, 2014

(54) METHOD AND APPARATUS FOR RESOURCE NEGOTIATION IN A DIRECT COMMUNICATION LINK NETWORK (75) Inventors: Nathan J. Smith, Savoy, IL (US); Michael H. Baker, Elmhurst, IL (US); Jeffrey D. Bonta, Arlington Heights, IL (US); Benedito J. Fonseca, Jr., Glen Ellyn, IL (US); Nitin R. Mangalvedhe, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 124 days.

(21) Appl. No.: 13/324,684

(22) Filed: Dec. 13, 2011

(65) Prior Publication Data
US 2013/0148589 A1 Jun. 13, 2013

(51) Int. Cl.
*H04W 72/04* (2009.01)
(52) U.S. Cl.
CPC .................................... *H04W 72/04* (2013.01)
USPC ............................ 370/328; 370/338; 370/342
(58) Field of Classification Search
CPC ...... H04W 72/04; H04W 28/20; H04W 84/18
USPC .................................. 370/328–330, 338, 342
See application file for complete search history.

(56) References Cited

U.S. PATENT DOCUMENTS

| 7,848,286 | B2 * | 12/2010 | Zhen et al. | 370/329 |
| 2008/0019315 | A1 * | 1/2008 | Machida | 370/330 |
| 2008/0112308 | A1 | 5/2008 | Cleveland | |
| 2008/0123520 | A1 | 5/2008 | Ji et al. | |
| 2008/0175199 | A1 * | 7/2008 | Shao et al. | 370/329 |
| 2009/0010218 | A1 * | 1/2009 | Tervonen et al. | 370/329 |
| 2009/0022136 | A1 * | 1/2009 | Joshi et al. | 370/348 |
| 2009/0052319 | A1 * | 2/2009 | Muqattash et al. | 370/230.1 |
| 2009/0129323 | A1 | 5/2009 | Chen et al. | |
| 2009/0257413 | A1 * | 10/2009 | Smith et al. | 370/338 |
| 2010/0118812 | A1 * | 5/2010 | Kim et al. | 370/329 |
| 2010/0189048 | A1 * | 7/2010 | Baker et al. | 370/329 |
| 2011/0002243 | A1 * | 1/2011 | Sherman et al. | 370/280 |

(Continued)

FOREIGN PATENT DOCUMENTS

WO 2008005938 A2 1/2008
WO 2008020164 A1 2/2008

OTHER PUBLICATIONS

International Search Report and Written Opinion in counterpart application PCT/US2012/067936 mailed Mar. 7, 2013.

(Continued)

*Primary Examiner* — Kibrom T Hailu
*Assistant Examiner* — Benjamin Lamont (57) ABSTRACT Some embodiments are directed to a method and apparatus for performing resource negotiation in a station implementing a direct communication link with at least one other station on an Orthogonal Frequency-Division Multiple Access (OFDMA) data channel. The station scans sub-channels on the data channel for base headers included in predefined position in transmissions sent on the sub-channel. The station then decodes a base header in at least one selected sub-channel to obtain parameters of a channel reservation. The obtained parameters are stored in a channel utilization table. The station selects a resource on the data channel in at least one of time or frequency that the station has observed to be free using information from the channel utilization table. The station then begins a resource negotiation process about the selected resource.

16 Claims, 8 Drawing Sheets

(56) References Cited

U.S. PATENT DOCUMENTS

| | | |
|---|---|---|
| 2011/0134759 A1* | 6/2011 | Kim et al. ............... 370/242 |
| 2011/0235576 A1 | 9/2011 | Gong et al. |
| 2011/0287796 A1* | 11/2011 | Jain et al. ............... 455/509 |
| 2011/0317569 A1* | 12/2011 | Kneckt et al. ............ 370/252 |
| 2012/0207036 A1* | 8/2012 | Ong et al. ............... 370/252 |
| 2013/0051256 A1* | 2/2013 | Ong et al. ............... 370/252 |

OTHER PUBLICATIONS

"An Asynchronous Multi-Channel MAC Protocol for Cooperative Networks" by Yongtai Liu et al., Copyright 2011 IEEE.

"Multi-Channel MAC Protocol for Multi-Hop Wireless Networks: Handling Multi-Channel Hidden Node Problem Using Snooping" by Myunghwan SEO et al, Copyright 2008 IEEE.

* cited by examiner

METHOD AND APPARATUS FOR RESOURCE NEGOTIATION IN A DIRECT COMMUNICATION LINK NETWORK

FIELD OF THE DISCLOSURE

The present disclosure relates generally to scheduling resources in a direct link network and more particularly to scheduling resources on an Orthogonal Frequency-Division Multiple Access (OFDMA) channel on stations involved in a direct connection.

BACKGROUND

In direct-link wireless networks, such as ad hoc networks, stations connect and communicate directly with other stations within a range without involving central access points. These stations may be, for example, portable radios. Stations with direct links to other stations have to determine when to access a data channel so as to avoid collisions and provide quality of service. One avenue of determining access to the data channel for station-to-station links requires that a centralized controller, such as an access point or a base station, determine channel access parameters including time, frequency, rate and power for each pair of stations with a direct link. On the surface, the centralized controller appears to be a simple and straight forward avenue for resolving conflicts and for ensuring that collisions do not occur when the stations are used in a system that already includes a centralized authority, as described for example in the Institute of Electrical and Electronics Engineers (IEEE) 802.16 standards or in the Long Term Evolution (LTE) standards. As used herein, "IEEE 802.16" refers to a set of IEEE Wireless LAN (WLAN) standards that govern broadband wireless access methods. Any of the IEEE standards or specifications referred to herein may be obtained at IEEE, 445 Hoes Lane, PO Box 1331, Piscataway, N.J. 08855-1331, USA. LTE is the Third Generation Partnership Project (3GPP) from the European Telecommunications Standards Institute (ETSI). LTE is used to create a high speed wireless data communications network. Any of the ETSI standards or specifications referred to herein may be obtained at 650, Route des Lucioles, 06921 Sophia-Antipolis Cedex, FRANCE.

Multiple access techniques, such as Orthogonal Frequency-Division Multiple Access (OFDMA), allow different users to share available bandwidth by allotting a fraction of a system resource to each user. For example, a receiving station in a first conversation may receive information from a transmitting station on a subset of the subcarriers on the data channel and a transmitting station in a second conversation may transmit information on a different subset of subcarriers on the data channel. However, an OFDMA system requires a complex centralized controller to resolve scheduling constraints. For example, because an OFDMA receiver must capture energy across the whole data channel band, if the receiving station is attempting to receive information from the first transmission station on subcarriers that are non-overlapping but close to the subcarriers used by the second transmitting station and if the second transmitting station is in close proximity to the receiving station, the second transmitting station may saturate or desense the receiver on the receiving station. To avoid saturating or desensing the receiver, the receiving station would have to inform the centralized controller that the second transmitting station is its neighbor so that the controller can schedule the two transmissions at different times. In order to avoid unnecessary constraints in the scheduling of transmissions, the centralized controller has to also consider the transmit power level of the second transmitting station as there is no need for the centralized controller to prevent the transmitting station with a low transmit power level from transmitting when its neighbor is receiving information. The centralized controller also has to consider a half-duplex transceiver in a time-division duplex (TDD) system because a station with a half-duplex transceiver cannot transmit and receive at the same time even if different subcarrier sets are used for the transmission and reception links.

A significant amount of resources may therefore be consumed to send parameters, such as neighbor lists, transmitter powers, and estimated ranges, from the stations to the centralized controller. Therefore, some systems allow each station to schedule its transmissions and reception. For example, the IEEE 802.11 standard provides a Distributed Coordination Function (DCF) for distributed resource negotiation. A station using the DCF randomly accesses the data channel. The station listens to the channel, measures activity on the channel, waits if the station detects channel utilization, and transmits a data frame when the channel is determined to be idle. The IEEE 802.11 standard also provides methods for reserving resources on the channel for long periods of time. The DCF, however, negotiates resources only in time. OFDMA adds a second dimension, that of frequency. The addition of a frequency component to a distributed scheduling approach greatly complicates resource negotiation and it is not obvious how to simply adapt existing negotiation protocols to handle both time and frequency.

In addition, the DCF may be an inefficient channel access method for real-time or constant bit rate traffic due to the DCF protocol's continual competition and backoff procedures. The DCF can employ any number of backoff processes, including a random backoff procedure. In random backoff, the station sets a timer to a random value chosen from a window. The station remains in the backoff phase so long as the timer has not expired. Similarly, the station could select a future frame at random and remain in backoff until that frame begins. Alternatively, the backoff duration could be a simple fixed value. Stations may set backoff timers after each successful transmission, retransmission or if the station detects that the medium is busy. The DCF resource negotiation protocol relies on the existence of idle channel time. In other words, the channel must be idle so the station's backoff timers can expire in order for the station to transmit a Request-to-Send (RTS) message. If such protocol were used in an OFDMA-slotted system in which a subset of the channel time is allocated to station-to-station communications, much of the channel time allocated to station-to-station communications would need to remain empty because stations would be running their backoff timers instead of transmitting or receiving. This would clearly increase the inefficiency of resource utilization.

Furthermore, if the DCF resource negotiation protocol is implemented in a time-slotted system, as disclosed for example in the IEEE 802.16 standard, in which a subset of the channel time is allocated to station-to-station communications, much of the channel time allocated to station-to-station communications would need to remain empty because stations would be running their backoff timers. This would clearly increase the delay in resource allocations in the direct link system. Although voice transmissions do not consume significant system resources compared to data transmissions, they require a more stringent quality of service with respect to resource allocation delays. Therefore, channel access procedure that can avoid large allocation delays while maintaining high allocation efficiency is desirable.

Accordingly, there is a need for an OFDMA channel access method and apparatus that allow stations involved in a direct connection to schedule resources on the OFDMA channel.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for performing resource negotiation in a station implementing a direct communication link with at least one other station on, for example, an Orthogonal Frequency-Division Multiple Access (OFDMA) data channel. The station scans sub-channels on the data channel for base headers included in predefined positions in transmissions sent on the sub-channel. The station then decodes a base header in at least one selected sub-channel to obtain parameters of a channel reservation. The obtained parameters are stored in a channel utilization table. The station selects a resource on the data channel in at least one of time or frequency that the station has observed to be free using information from the channel utilization table. The station then begins a resource negotiation process about the selected resource.

Figure 1:
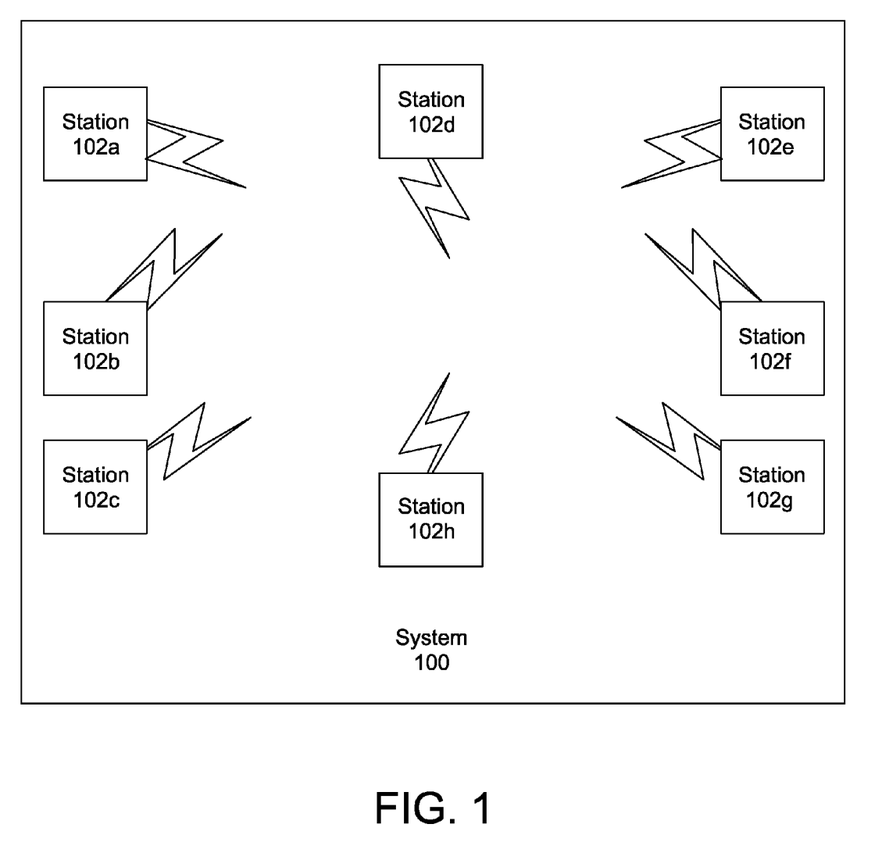
FIG. 1 is a block diagram of a system operating in accordance with some embodiments.

FIG. 1 is a block diagram of a system used in accordance with some embodiments. System 100 may include portable/mobile communication devices 102 that are configured to communicate directly with other communications devices on a data channel. Portable/mobile communication devices 102 may be radios, for example, portable two-way radios, mobile radios, or other similar portable or mobile communication devices. Portable/mobile communication devices 102 are also referred to as stations 102 in this discussion. System 100 may implement multiple access techniques, such as Orthogonal Frequency-Division Multiple Access (OFDMA), that allow different stations 102 to share an available bandwidth by allotting to each station a fraction of the system resources. Other components of system 100 are not shown for ease of illustration. Other access techniques may be used in some embodiments.

A station, for example station 102a, used to transmit signals to one or more destination stations on an OFDMA data channel may do so by employing a distributed resource negotiation protocol. This protocol is carried out on the data channel and it provides stations 102 with the ability to scan sub-channels on the data channel, to discover reservations by decoding headers located in transmissions, and to select resources in frequency and time that each station has observed to be free. The resource negotiation protocol also allows a transmitting station, in this example station 102a, to perform in-band resource negotiation with a receiving station and come to a mutual decision as to which resources should be used in the communication between station 102a and the receiving station. The resource negotiation protocol also allows transmitting station 102a to establish a recurring reservation of resources for a period of time through the transmissions of resource reservation messages.

Figure 2:
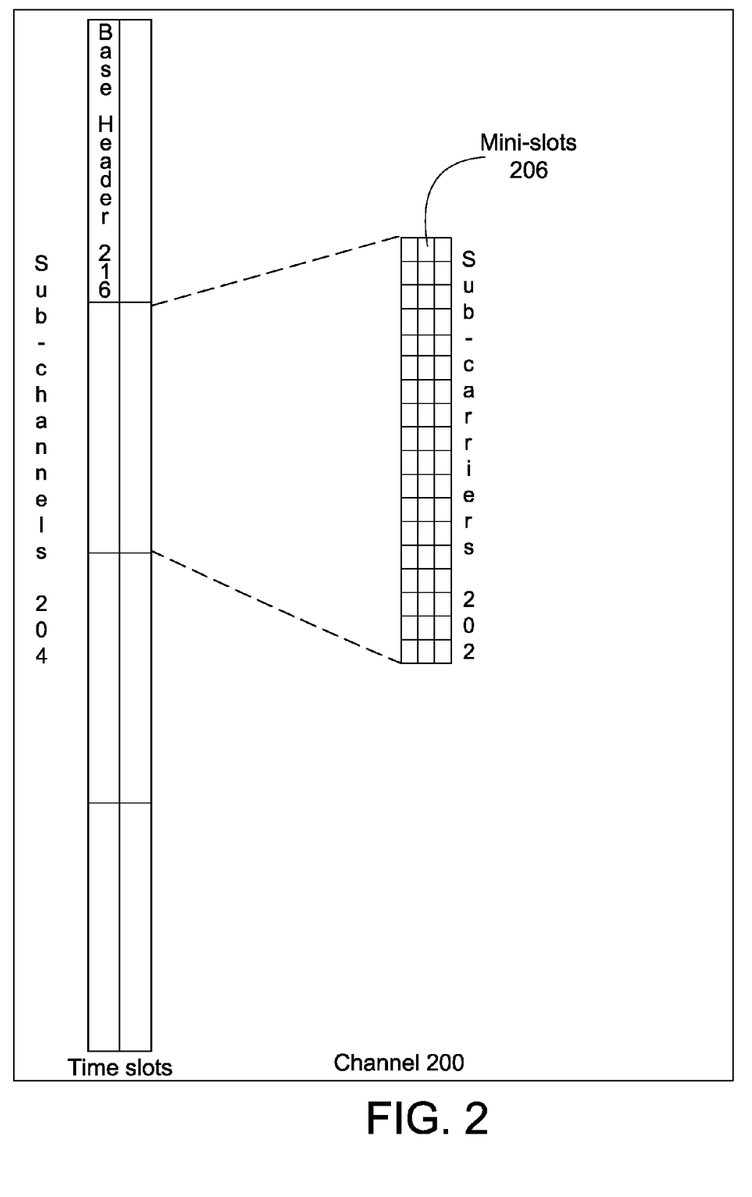
FIG. 2 is a block diagram of an OFDMA channel in accordance with some embodiments.

FIG. 2 is a block diagram of an OFDMA channel used in accordance with some embodiments. OFDMA channel 200 is divided into a number of subcarriers 202 that are grouped together in sub-channels 204, each of which is then paired together with a number of symbols in time and used to form rectangular, time-frequency units called slots. A slot is the smallest allocatable unit of resource on the channel and multiple slots may be aggregated together in time and/or frequency to allow a station to transmit as much or as little data as desired. Stations 102 perform multiple access on the channel, wherein a first station may transmit on, for example, a set of sub-channels, while a second station simultaneously transmits on, for example, another set of non-overlapping sub-channels.

All stations prefix their transmissions with a base header 216 that is transmitted at a commonly known modulation and coding rate. Base header 216 has a fixed length, is typically the first code-word or words in a transmission and is typically located in a predefined position of the transmission. For instance, base header 216 may be placed in a first mini-slot 206 of the transmission, where the first mini-slot 206 may be the mini-slot in the lowest numbered sub-channel of the transmission and the mini-slot that begins in the first symbol of a slot time. Alternately, as shown in FIG. 2, base header 216 could be placed at the edges of an allocation (i.e. first and/or last sub-channels), or in the first mini-slot of every sub-channel in the allocation. It should be said that, differently from existing centralized communication systems in which stations listen to a base station to synchronize themselves and determine time-slot boundaries, in accordance with some embodiments, stations listen to base headers 216 transmitted by other stations and use their internal clock mechanisms to determine the time-slot boundaries. For this reason, the base headers 216 also contain information about the number of slots in the allocation period and the number of frequency sub-channels in the frequency band.

Base header 216 is used to convey the parameters of a channel reservation. The information in base header 216 is transmitted from the transmitting station so that neighboring stations can develop a picture of how the channel is being used by the transmitting station. The information transmitted in base header 216 may include the dimensions of a reservation (for example, the sub-channel range and slot count), a lifetime of the allocation (for example, the time remaining in the reservation such as frames, slots and instances), and the periodicity of the allocations (how often the reservation occurs, such as frames and slots). Base header 216 may also include addresses for the transmitting and receiving stations associated with the transmission, a flow identifier, transmit power for path loss estimation, or other informational elements.

The fields described in base header 216 are used in a scanning process and stored in a channel utilization table (CUT) on the receiving station. A station uses its CUT to determine which sub-channels are available for use based on the combination of time and frequency. If no entry in the station's CUT can be found that indicates a particular sub-channel is reserved, when considering all reservation instances across a maximum reservation time of a link, then the sub-channel is presumed to be free. Although a station's CUT is populated mainly using the information received from base headers transmitted by other stations, a station may optionally mark sub-channels as busy when it detects a high energy during the scanning process. This option facilitates avoidance of collisions on the data channel that could occur when a first station fails to receive a base header 216 from a second station that is using a particular sub-channel when such a base header is not transmitted by an interference source. Because high-energy receptions can happen due to sporadic noise or interference in the system, the sub-channel is marked as busy temporarily, only for the one or a few frame instantiations. Alternatively, the station that detects a high-energy in a given sub-channel that is marked as free in the CUT lowers the priority of selecting such sub-channel during its channel negotiations and reservations.

The CUT includes one row for each reservation received and includes columns for at least the dimensions, the lifetime, an expiration time (calculated from lifetime in a received base header), the periodicity and/or a periodicity offset. The periodicity offset indicates the offset to an instance of the reservation. The offset may be relative to a fixed point, for example, a superframe boundary. Alternatively, the offset is implemented as a counter that indicates the time until the reservation's next instance. Additional fields, such as the addresses for the transmitting and receiving stations associated with the transmission, a flow identifier, flags indicating how the reservation was observed (i.e. from the transmitter or from the receiver) and various other metrics are also included in the CUT as necessary to support distributed negotiations.

Base header 216 may also optionally include a transmission list (TX_LIST), a reception list (RX_LIST), or both. The TX_LIST and the RX_LIST lists provide reservations information, as observed by neighboring stations. The TX_LIST is a list of channels reserved for a transmission and the RX_LIST is a list of channels reserved for a reception, as seen by the transmitting station. Each entry of a TX_LIST or RX_LIST includes at least a list of sub-channels being used in a current frame. In some embodiments, the information obtained from the TX_LIST and/or the RX_LIST is stored in the CUT on the transmitting and receiving stations. The information obtained from the TX_LIST and/or the RX_LIST may include the dimensions of an observed reservation, the lifetime of the observed reservation, the periodicity of the observed reservation, and the offset of the observed reservation. The TX_LIST and/or RX_LIST may also include identifiers for the transmitting station and the receiving station of the reservation, a flow identifier, a hop counter, or other information elements.

Information gathered from the TX_LIST and the RX_LIST can be used along with information stored in the station's CUT to determine if a particular sub-channel is reserved. To illustrate the importance of the information present in the TX_LIST and RX_LIST and why information present in the TX_LIST and RX_LIST is used to update a station's CUT, consider the following example: a first station transmits base header 216 that indicates the reservation of a given subset of slots. A second station geographically in proximity to the first station receives the base header 216 and updates its CUT. A third station geographically located a further distance from the first station may not receive the base header 216. Thus, the third station would not receive the reservation information from the first station and mistakenly consider that some subset of slots is available for use. This is known as a "hidden node problem". By using the TX_LIST and RX_LIST, a hidden node problem is avoided because the reservations of the first station are included in the TX_LIST or RX_LIST of any transmission of the second station, which is received by the third station. The contents of the TX_LIST and/or the RX_LIST are assigned equal weight such that learning of a reservation from the TX_LIST and/or the RX_LIST is equivalent to directly receiving base header 216 that describes the reservation. A weight is included with each entry read from the TX_LIST and/or the RX_LIST, wherein when the cumulative weight of multiple CUT entries for the same reservation information exceeds a defined confidence threshold, then the reservation is viewed as valid and is treated equal to directly receiving base header 216 that describes the reservation.

The weight can be determined by, for example, calculating a path loss between the source of the TX_LIST and/or the RX_LIST and the receiver, wherein the calculated path loss is converted to a weight where the sub-channels observed to be busy by stations with lower path loss levels are given greater weight than the sub-channels observed to be busy by stations with higher path loss levels. This follows the concept that stations with a low path loss are close together and share a common neighborhood. A fixed weight is assigned to each instance of a reservation received in the TX_LIST and/or the RX_LIST. The weight associated with a reservation from the RX_LIST is different from the weight associated with a reservation from the TX_LIST. In this manner, precedence is given to deferring to receptions over deferring to transmissions. Sub-channel utilizations directly observed by a station are assigned greater weight than those observations received through a forwarded TX_LIST or RX_LIST. Forwarded observations carry the weight assigned by the forwarding station and is locally assigned a weight that is a function of the forwarded weight and the forwarding station's proximity. So, for example, when station 102a received an RX_LIST from station 102b, station 102a calculates station 102b weight and then multiplies the weights in the RX_LIST received from station 102b by station 102b weight. The forwarded TX_LIST/RX_LIST includes the lowest weight assigned to the entry by any station that has observed the resources as being in use.

A station may also use the information in the CUT to prevent receiver saturation or signal to interference plus noise (SINR) desense. During the resource negotiation, when a receiving station determines that the resources proposed by a transmitting station are at least sometimes in the same frame as a nearby high-power transmitter, then the receiving station could decide to reject the proposed resources. Because desensitization or "desense" of a receiver in the receiving station to the low-power signal may occur when the receiving station receives a low-power signal from a transmitting station and a high-power signal from a different transmitting station at the same time. In other words, the high-power signal may cause the low-power signal to fall below the receiver's detectability threshold. For instance, when the high power transmitting station is located near the receiving station operating in the same time slot but on a different frequency sub-channel, the high transmit energy can desensitize the receiver. This causes the receiver to set its automatic gain control (AGC) to set a high level of attenuation in order to prevent saturation of the receiver. The increased attenuation from the AGC adjusts the interference signal for optimal power level for operation of the receiver's analog to digital converters (ADC). Unfortunately, ADCs have a limited dynamic range and increasing the attenuation at the front of the receiver causes an increase in the noise floor of the receiver and lowers the SNR of the desired receive signal. If the attenuation changes due to the interference being large enough, small signals that would normally be detected in the receiver can drop below the ADC detection region.

For many communication systems, an early portion of the base header signal contains symbols that are used by the receiver for automatic gain control. Therefore, some embodiments enable long term schedule grants for peer-to-peer communication. These long term grants allocate periodic portions of the OFDMA resources (time-slots and sub-channels) to a particular pair of users for a given time (grant period). The algorithm used to estimate AGC can use previous estimates of AGC from the same grant period in its mathematical formula, thus improving the AGC estimate. Because mobile devices experience different pathloss as they move due to fast fading and shadow fading, the AGC of a receiver in a long term communication session may be readjusted multiple times over the session. The AGC setting can also be affected by transmissions from neighboring transmitters that are scheduled during the same timeslots as our long term grants. A large increase in a receiver's AGC attenuation over a period of a long term grant could indicate the presence of a high power neighbor transmission or an external interference source. When large AGC changes occur, the receiver may update its TX_LIST and CUT to indicate that an OFDMA resource region of frequency sub-channels may contain a high power transmitter or interference source. When periodic instances of high AGC attenuation are observed, the receiver may adjust its TX_LIST and CUT to indicate sub-channels that may contain high power transmissions in specific future frames.

Information in the TX_LIST and the RX_LIST are also helpful in overcoming AGC issues. In particular, the information in the TX_LIST and RX_LIST may be used to supplement incomplete information in the CUT. The information in the CUT may be incomplete due to, for instance, the inability of a receiving station to receive a weak signal. The receiving station may be unable to receive a weak signal if the receiving station sets its AGC off a particularly strong transmission from a neighboring transmitting station, an example of which is shown in FIG. 3.

Figure 3:
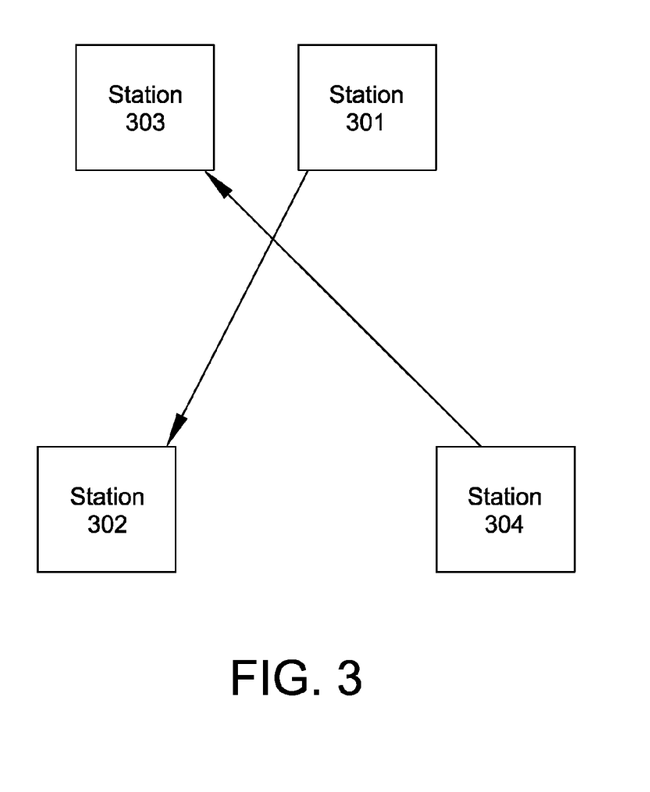
FIG. 3 is a block diagram of a potential interference scenario within a system requiring automatic gain control setting in accordance with some embodiments.

FIG. 3 is a block diagram of a scenario where automatic gain control must be properly adjusted in accordance with some embodiments. A receiver at station 303 may set its AGC predominantly off the transmission of a neighboring station 301. As a result, station 303 may not have sufficient dynamic range to be able to decode a transmission sent from station 304, even when there is sufficient received signal strength at station 303. This may occur even though station 301 and station 304 are transmitting on different sub-channels of the same time-slot. When this occurs, station 303 will not be able to decode the control headers transmitted by station 304 and station 303 will be unaware of station 304 channel reservations. However, in some embodiments, station 301 may know of station 304 reservation and station 301 shares that information with station 303 and all of its other neighbors through the TX_LIST and RX_LIST.

The TX_LIST, RX_LIST, a hop counter and unique sequence identifier, are also used to tune the degree of spatial reuse. For example, channel use information is relayed through the TX_LIST and/or the RX_LIST for a number of hops beyond a station that observed a channel as being used. A hop counter is used to determine the number of hops from the observing station, wherein information obtained from the TX_LIST and/or the RX_LIST remain valid within a maximum number of hops ($H_{max}$ hops) from the observing station. If a station has observed a reservation directly, then the hop counter field is set to one. Upon reception of the TX_LIST and/or the RX_LIST, stations determine whether or not the contents of the lists are presently stored in the CUT by comparing a sequence identifier in the lists with a sequence identifier stored in the CUT. When the received sequence identifier is considered newer than a stored sequence identifier, then the station may store the contents of the TX_LIST and/or the RX_LIST in the CUT. After the contents of TX_LIST and/or the RX_LIST are stored, the station forwards the TX_LIST and/or the RX_LIST and increments the hop count field so long as the value in the hop count field does not exceed $H_{max}$ value. Large values of $H_{max}$ therefore represent conservative spatial reuse where a station would not reuse a resource that is in use within $H_{max}$ hops of itself. Small values of $H_{max}$, on the other hand, represent more aggressive spatial reuse where stations could reuse resources from neighbors fewer hops away.

The allocation dimensions, the TX_LIST and/or the RX_LIST are further employed to reduce the amount of time required to complete a scanning process on a single frame, though at a possible loss of fidelity. After receiving base header 216, possibly with the TX_LIST and/or the RX_LIST, from a neighbor station, a receiving station could optionally not scan any sub-channels included in either the header's dimension field or in either of the TX_LIST or the RX_LIST. Using this information in the scanning process saves energy in the scanning station and possibly reduces device complexity and cost. On the other hand, doing so could result in the receiving station missing resource negotiation requests or responses as well as announcements of long term reservations.

It should be noted that the negotiation for resources can be for resources to enable a full bi-directional communication session. In other words, a block of resources (time-slots and sub-channels) is normally reserved for the first transmit (device 1) only. However, because of long term grants, during the negotiation both the transmitter (device 1) and receiver (device 2) can estimate how many resources they may need. The negotiation then defines the proportion of future resources allocated to transmissions by devices 1 and 2. In one embodiment, the two devices could transmit in alternating frames.

Figure 4:
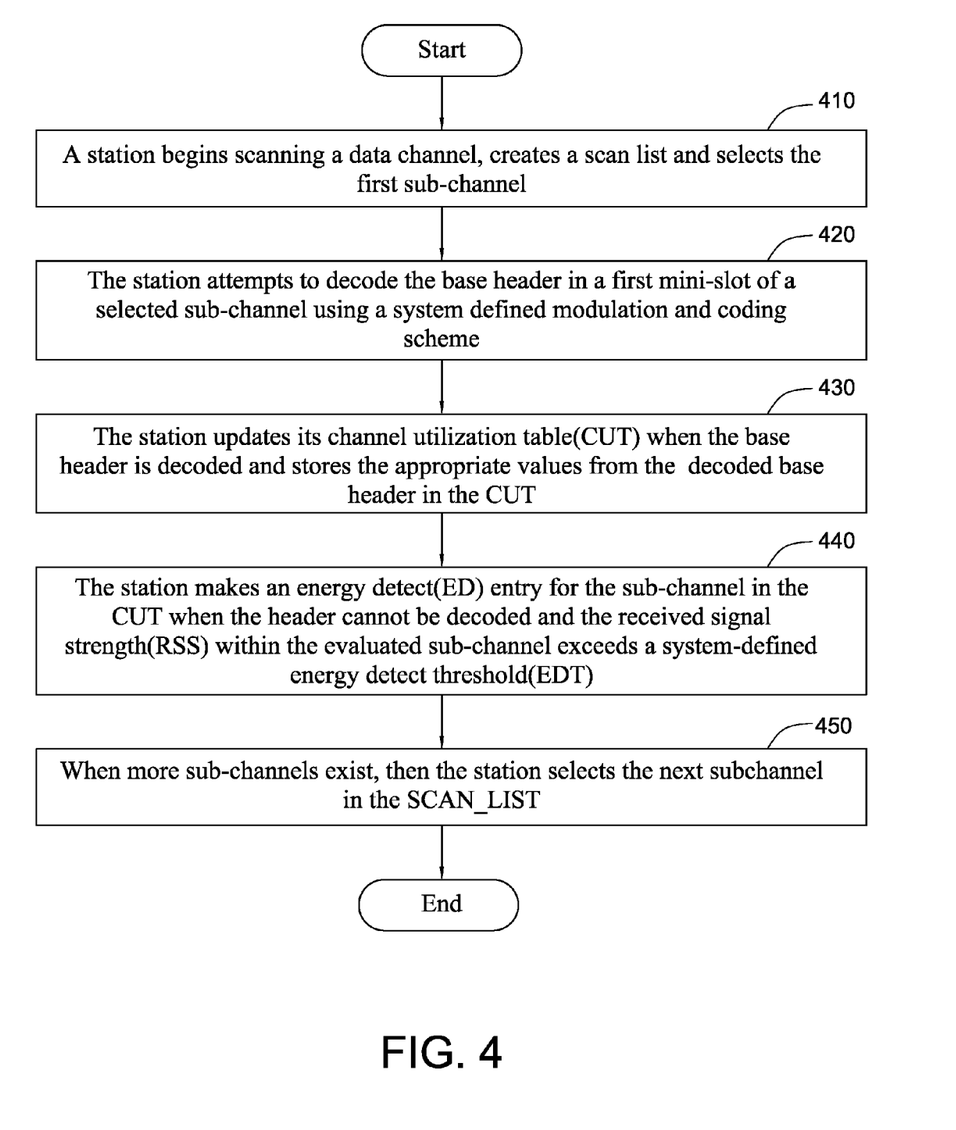
FIG. 4 is a flow diagram of a scanning process in accordance with some embodiments.

FIG. 4 is a flow diagram of a scanning process used in accordance with some embodiments. In 410, a station begins scanning a data channel, creates a scan list (SCAN_LIST) and selects the first sub-channel. The station may create the SCAN_LIST by adding all sub-channels to the SCAN_LIST. Optionally, the SCAN_LIST can be constructed to include only those sub-channels for which no reservation information is stored in the CUT or whose reservation is approaching expiration. Sub-channels of observed reservations may also be added to the SCAN_LIST to periodically monitor the status of observed reservations. In addition, following the Fast Fourier Transform (FFT) of a received symbol, the receiving station could build its SCAN_LIST as an ordered list of sub-channels based on the received power in each sub-channel, wherein the sub-channel with the highest power is placed in the first position. This approach is used in conjunction with a scanning optimization method where sub-channels listed in a dimensions field of a received base header, the TX_LIST or the RX_LIST are skipped. While the scanning optimization method is likely to reduce scanning time and computational complexity, it may also reduce reliability.

In 420, the station attempts to decode the base header in a first mini-slot of a selected sub-channel using a system defined modulation and coding scheme (MCS). In 430, the station updates its CUT when the base header is decoded and stores the appropriate values from the decoded base header, including the reservation expiration or lifetime values, in the CUT. The station extracts the optional TX_LIST and/or RX_LIST from the base header and the station uses information from the TX_LIST and/or the RX_LIST to determine which other transmitters may be present on the OFDMA symbol and the associated sub-channels. Based on this information, the station may store reservation information as "reported busy" and may update information about sub-channels with reservation information in its CUT. The station may also associate a weight with the status of these sub-channels, wherein the weight indicates the station's level of confidence that the sub-channels are busy within its neighborhood. The weight is set, for example, based on the path loss between the station and the source of the TX_LIST and/or the RX_LIST, wherein smaller path loss values result in a greater weight value and larger path loss values result in a lesser weight value. In some embodiments, the station assigns maximum weight to force conservative sub-channel channel reuse. The station may label CUT entries obtained from the TX_LIST so that they are not infinitely propagated. As noted previously, controlled propagation can be supported through the use of a hop count or similar field.

Consider the following example where a station, for example station 102e receives a Medium Access Control (MAC) header from station 102a, wherein the MAC header includes a RX_LIST that identifies station 102d as a receiver in sub-channels 15 and 16. Station 102e updates its CUT with this information. Consider that station 102e starts a negotiation process with station 102f and sub-channels 14, 15, 16 and 17 are deemed to be idle (i.e., no transmitters in the vicinity of station 102e and station 102e has not received any messages indicating that any of its neighbors are receiving on such slots). Because station 102e knows that sub-channels 15 and 16 are being used by a neighbor of a neighbor (i.e. by neighbor of station 102d), station 102e gives a lower priority to sub-channels 15 and 16 to avoid excessive interference on the receiver of sub-channels 15 and 16.

After decoding the MAC header, station 102e may optionally remove a subset of the sub-channels that it has determined to be busy with a certain degree of confidence from the SCAN_LIST. For example, station 102e removes sub-channels 15 and 16 from its SCAN_LIST. As noted, this optimization results in reduced reliability although it also allows for a lower cost implementation.

In 440, when the header cannot be decoded and the received signal strength (RSS) within the evaluated sub-channel exceeds a system-defined energy detect threshold (EDT), then the station makes an energy detect (ED) entry for the sub-channel in the CUT. The expiration time for the sub-channel may be the system defined energy-detect reservation duration (EDRD). Optionally, the AGC information would be made available to the MAC layer in order to allow the normalization of the RSS indication. Remember that the AGC determines the amplification constant in all sub-channels and this amplification constant is different depending on the set of transmitters in a given OFDMA frame.

In 450, when more sub-channels exist, then the station selects the next sub-channel in the SCAN_LIST. The station returns to 420 to process the next sub-channel in the SCAN_LIST. If all sub-channels have been inspected, then the station terminates the scanning process. Once the station has scanned for at least a system defined minimum amount of time, the station begins the resource negotiation process. The system defined minimum amount of time may be no less than an amount of time equal to the system defined maximum traffic periodicity (i.e. the longest amount of time the system allows between transmissions, for example, a maximum periodicity of one packet every 100 ms). The resource negotiation process may include an exchange of one or more of quality of service (QoS) Connection Request (QCR) messages, Alternate Resource Counterproposal (ARC) messages, Resource Reservation (RR) messages or Connection Release (CRL) messages.

Each station improves its resource allocation decisions by periodically making use of a ternary pseudo-random sequence to determine its role in each period of an allocation. Possible roles for each station are transmission (TX), reception (RX) or monitor. While in the TX role, a station transmits at least the base header containing reservation information to its neighbors. The station(s) receiving the base header is in the RX role, wherein the receiving station attempts to receive headers from transmitting stations that are located within close proximity to the receiving station. While in the monitor role, both transmitting and receiving stations attempt to receive the base headers from transmitting stations located within close proximity. The monitor role allows stations to avoid potential automatic gain control (AGC) issues.

Once a station pair has established a resource reservation, the transmitter may have difficulty maintaining a view of the resource reservations in its neighborhood. Similarly, the receiver does not ordinarily have the opportunity to reassert its channel reservation. In order to allow transmitting stations to learn about other stations transmitting in the same OFDMA frame, in some embodiments, transmitters and receivers may switch roles in a set of OFDMA frames allocated to their communication to mutually confirm the negotiated resources. Whenever two stations, for example stations 102a and 102b, decide to communicate using a set of OFDMA frames in a superframe, they also allocate the pseudo-random ternary sequence known by both stations 102a and 102b. The sequence tells the role of the station in the next OFDMA frame allocated to the communication (TX, RX or monitor). When station 102a is in the TX role, station 102b is in the RX role and vice versa. When station 102a is in the monitor role, then station 102b is also in the monitor role.

When in the TX role, station 102a transmits at least the base header including the reservation information and optionally transmits a data message. When in the RX role, station 102b may receive, demodulate and decode a message sent by station 102a in the assigned resources. Station 102b may also scan the channel according to the scanning process described above to detect reservation changes since it last performed a scan. When stations 102a and 102b are in the monitor role, they perform the scanning process and may not expect to receive or decode a message from one another. The monitor role is used to resolve AGC issues resulting from the transmitting and receiving station pair being close to one another and having the transmitting station set the receiving station's AGC artificially high. Because the ternary role sequences are pseudo-random, stations in the RX and monitor roles will be able to listen to transmissions from neighboring stations in the TX role potentially following a different pseudo-random sequence.

Alternatively, stations maintain their original TX-RX roles and occasionally suppress their transmission to monitor their neighbors. This is accomplished using a pseudo-random binary sequence in which, for example, an entry "1" means TX and an entry "0" means "suppress-TX-and-listen". In both cases, resource allocations may include requests for the allocation of additional frames for the instances in which the transmitter is in a monitor, RX or "suppress-TX-and-listen" state. Alternatively, if a receiver in a long term grant observes large periodic changes in the AGC values, the receiver may want to schedule a monitor period coinciding with the next anticipated AGC high attenuation region in order to measure receive signal strength and capture and decode any base header signals from nearby transmission sources.

The resource negotiation process differs slightly between the station initiating the negotiation (the transmitter), and the station participating in an initiated negotiation (the receiver). All protocol messaging is handled on the data channel itself in the resources that are being negotiated and reserved. If, for example, station 102a wishes to suggest that it transmits in every $4^{th}$ frame to station 102b on sub-channels in the range [4, 7] in time slot 5, then station 102a will send its QCR to station 102b on sub-channels [4, 7] in time slot 5. Depending on the type of answer, reply messages may or may not be in the same resources in which a request was transmitted.

A recurring concept used throughout the negotiation process is that of an allocation instance. An allocation instance is a set of resources with frequency and time components that occurs once every period. If a QCR were sent in frame n with a periodicity of p, then subsequent allocation instances occur in frames n+(q−1)p, where q is the instance identifier. For example, an allocation occurring every $4^{th}$ frame beginning in frame 9 and lasting Q periods (or instances) have instances 1, 2, 3, 4, ..., Q in frames 9, 13, 17, 21, ..., 9+(Q−1)p.

Figure 5:
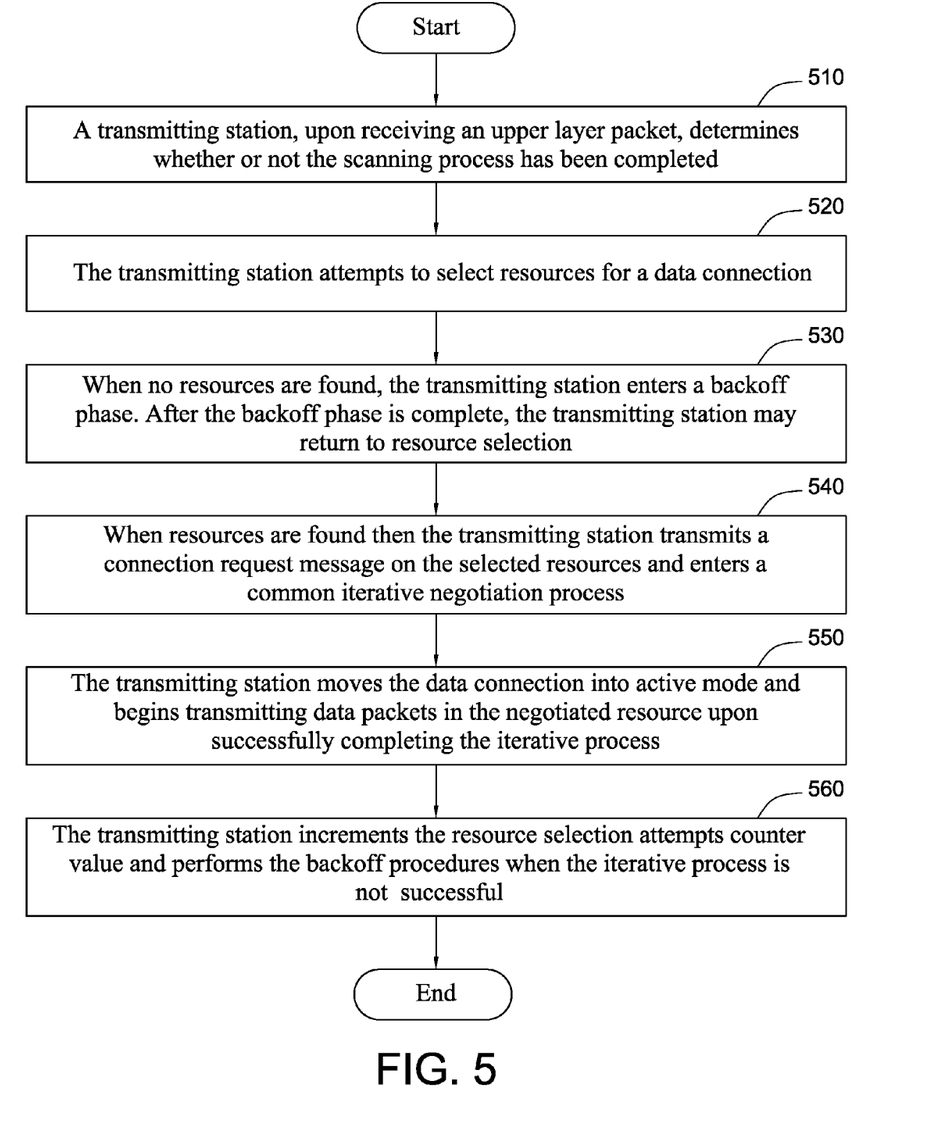
FIG. 5 is a flow diagram of a resource negotiation process carried out by a transmitter in accordance with some embodiments.

FIG. 5 is a flow diagram of a resource negotiation process carried out by a transmitter in accordance with some embodiments. In 510, a transmitting station, upon receiving an upper layer packet determines whether or not the scanning process has been completed. If the scan has not been completed, then the transmitting station waits until the scanning is completed. In 520, the transmitting station attempts to select resources for a data connection. In 530, when no resources are found, the transmitting station enters a backoff phase. Any number of backoff processes could be employed including random backoff. In random backoff, the transmitting station sets a timer equal to a random value chosen from a window. The transmitting station remains in the backoff phase so long as the timer has not expired. Similarly, the transmitting station could select a future time-slot at random and remain in backoff until that slot begins. Alternatively, the backoff duration could be a simple fixed value. While in the backoff phase, the transmitting station may not participate in resource negotiation but perform scanning Once backoff is complete, a Resource Selection Attempts Counter (RSAC) will be incremented to indicate the number of times the transmitting station failed to find resources for a particular data packet exchange. If the RSAC equals a maximum RSAC (MaxRSAC) value, then the transmitting station terminates the negotiation process and may not reattempt negotiation. If the RSAC is less than the MaxRSAC value, then the transmitting station returns to resource selection.

In 540, when resources are found, then the transmitting station transmits a QCR on the selected resources and enters a common iterative negotiation process beginning, as described in FIG. 7 below. In 550, the transmitting station moves the data connection into active mode and begins transmitting data packets in the negotiated resources, upon successfully completing the iterative process. In 560, the transmitting station increments the RSAC value and performs the backoff procedures as described in 530, when the iterative process is not successful.

Figure 6:
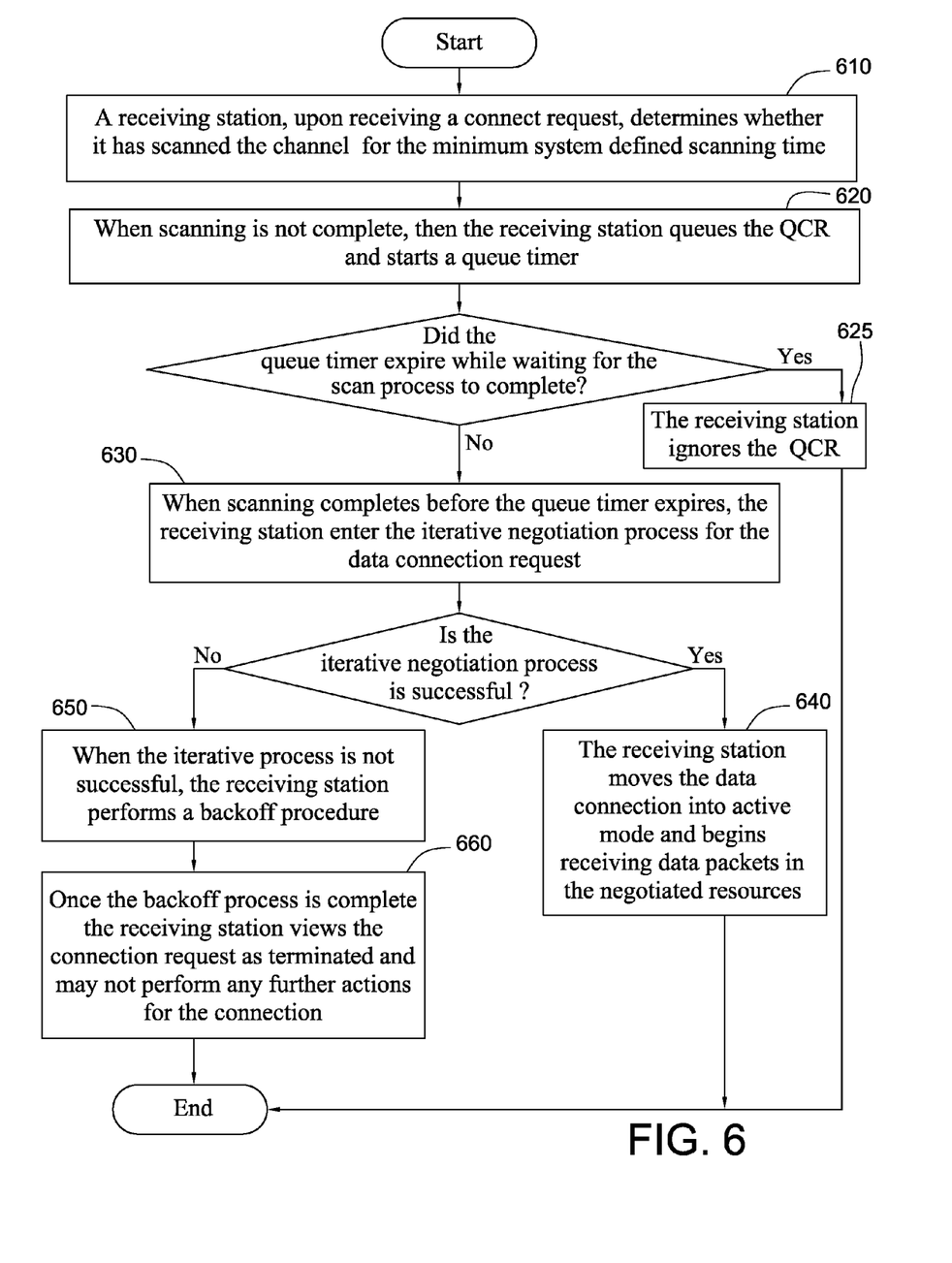
FIG. 6 is a flow diagram of a resource negotiation initiation process carried out at a receiving station in accordance with some embodiments.

FIG. 6 is a flow diagram of a resource negotiation initiation process carried out at a receiving station in accordance with some embodiments. In 610, the receiving station, upon receiving a QCR, determines whether it has scanned the channel for the minimum system defined scanning time. In 620, when scanning is not complete, the receiving station queues the QCR and starts a queue timer. The queue timer may be equal to a QCR response timeout, $QCR_{timeout}$. In 625, when the queue timer expires while waiting for the scan process to complete, then the receiving station ignores the QCR. In 630, when scanning completes before the queue timer expires, the receiving station enters the iterative negotiation process for the data connection request, as described in FIG. 7 below. In 640, the receiving station moves the data connection into active mode and begins receiving data packets in the negotiated resources when the iterative negotiation process is successful. In 650, the receiving station performs a backoff procedure when the iterative negotiation process is not successful. Any number of backoff processes could be employed including random backoff. While in the backoff phase, the station may not attempt to participate in any resource negotiation but performs scanning. In 660, once the backoff process is complete, the receiving station views the connection request as terminated and may not perform any further actions for the connection. The process may be restarted with the reception of a new QCR.

Figure 7:
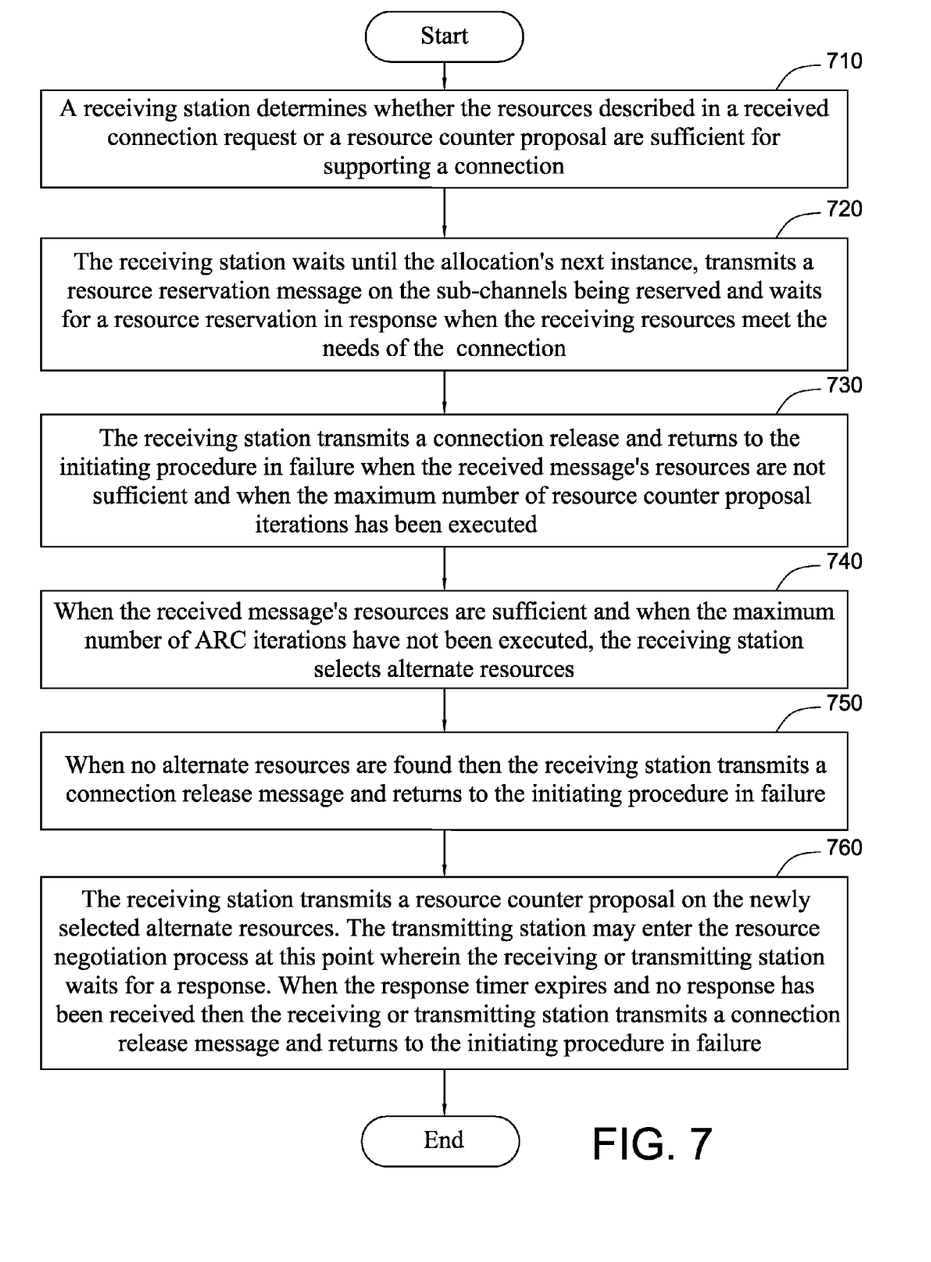
FIG. 7 is a flow diagram of a distributed resource negotiation process in accordance with some embodiments.

FIG. 7 is a flow diagram of a distributed resource negotiation process in accordance with some embodiments. Both the transmitting station and the receiving station perform similar ARC negotiations. The entry point to the resource negotiation process depends on whether a station is a transmitter or a receiver. The receiving station enters the process at 710 while the transmitting station enters the process at entry point 730.

In 710, the receiving station determines whether the resources described in a received QCR or ARC are sufficient for supporting a connection. Sufficient may be defined to be both free (e.g. not marked as busy in the station's CUT) and exhibiting channel conditions supporting the data rate proposed in the received message. In 720, the receiving station waits until the allocation's next instance, transmits an RR message on the sub-channels being reserved and waits for a RR in response when the receiving resources meet the needs of the connection (i.e. are sufficient). The RR response is expected in the next resource instance on the same sub-channels. When an invalid RR response is received, then the receiving station transmits a CRL in the next allocation instance and return to the initiating process in failure. When no RR is received in the expected resources, then the receiving station returns to waiting until the allocation's next instance, provided it has not yet transmitted the maximum number of RR messages for this negotiation process. When the maximum number of RR messages has been transmitted and still no RR was received in response, then the receiving station transmits a CRL in any available resources and returns to the initiating procedure in failure. When an RR is received prior to an invalid RR response being received, then the receiving station returns to the initiating process in success.

In 730, the receiving station transmits a CRL and returns to the initiating procedure in failure when the received message's resources are not sufficient and when the maximum number of ARC iterations has been executed. Otherwise, in 740, when the received message's resources are sufficient and when the maximum number of ARC iterations have not been executed, the receiving station selects alternate resources. In 750, when no alternate resources are found, then the receiving station transmits a CRL and returns to the initiating procedure in failure. In 760, the receiving station transmits an ARC on the newly selected alternate resources. The transmitting station may enter the resource negotiation process at this point, wherein the receiving or transmitting station waits for a response. When the response timer expires and no response has been received, then the receiving or transmitting station transmits a CRL and returns to the initiating procedure in failure. If an ARC is received, then the process returns to 710. When an RR is received, then the receiving or transmitting station determines whether the resources are valid. A valid RR is received on the same resources used to transmit the last QCR or ARC. When the RR is received on any other resources, then the RR is invalid. When the RR is invalid, then the receiving or transmitting station transmits a CRL and return to the initiating procedure in failure. When the RR is valid, then the receiving or transmitting station transmits an RR in response on the sub-channels being reserved and in the next resource instance and returns to the calling procedure in success.

Each of the three types of response messages (ARC, CRL and RR) must be transmitted in specific locations and at specific times. ARC response messages may be located at any time and in any sub-channel. The resources used to transmit an ARC indicate the resources that are proposed for use. For example, when an ARC for a flow with a periodicity of p is transmitted in frame n on sub-channels in the range [s1, s2], then it is understood that the ARC proposes the use of sub-channels [s1, s2] every pth frame beginning with frame n. CRL response messages may be located in the next instance of the resources being released or rejected. For instance, if a CRL for a flow with a periodicity of p is transmitted in frame n on sub-channels in the range [s1, s2], then the CRL may be transmitted in frame n+p on sub-channels [s1, s2]. RR response messages may be located in the resources being reserved and should be transmitted in the next instance of the same resources in which a QCR or ARC was received. For instance, if an ARC for a flow with a periodicity of p is transmitted in frame n on sub-channels in the range [s1, s2], then the RR may be transmitted in frame n+p on those same sub-channels [s1, s2].

Because the base headers of transmissions include a reservation lifetime, the resources occupied by a connection will remain reserved so long as the lifetime field remains positive. Stations continue to update the lifetime field of the base header at each transmission to indicate how much time remains in the reservation. Methods of modifying resource reservations, such as increasing or decreasing reservation duration, or adding or subtracting sub-channels, can be implemented on top of this protocol. For instance, transmitters and receivers periodically transmit an RR to modify the resource reservation. While the above discussion uses the term frame to describe the time component in the resource negotiations and schedule, it should be understood that this is not meant to limit embodiments to a frame based level of granularity. Rather, embodiments could be applied to any time unit such as time-slot, frame, superframe, hyperframe, symbol-time, etc.

Embodiments of the resource negotiation protocol described herein are therefore unique in that they include distributed resource negotiation in frequency and time. This negotiation is supported by the base rate headers included in each allocation. The base rate headers, in turn, provide a unique mechanism of scanning in an OFDMA system. While the IEEE 802.11 standard has a similar header, called the PLCP, this header is located only in time, not frequency, and does not include allocation details beyond the amount of time that the current transmission would be on the channel. Unlike the base header described herein, the PLCP also does not indicate future channel accesses. The resource negotiation protocol described herein also reduces the periodicity of resource negotiations through the use of long term allocations.

Figure 8:
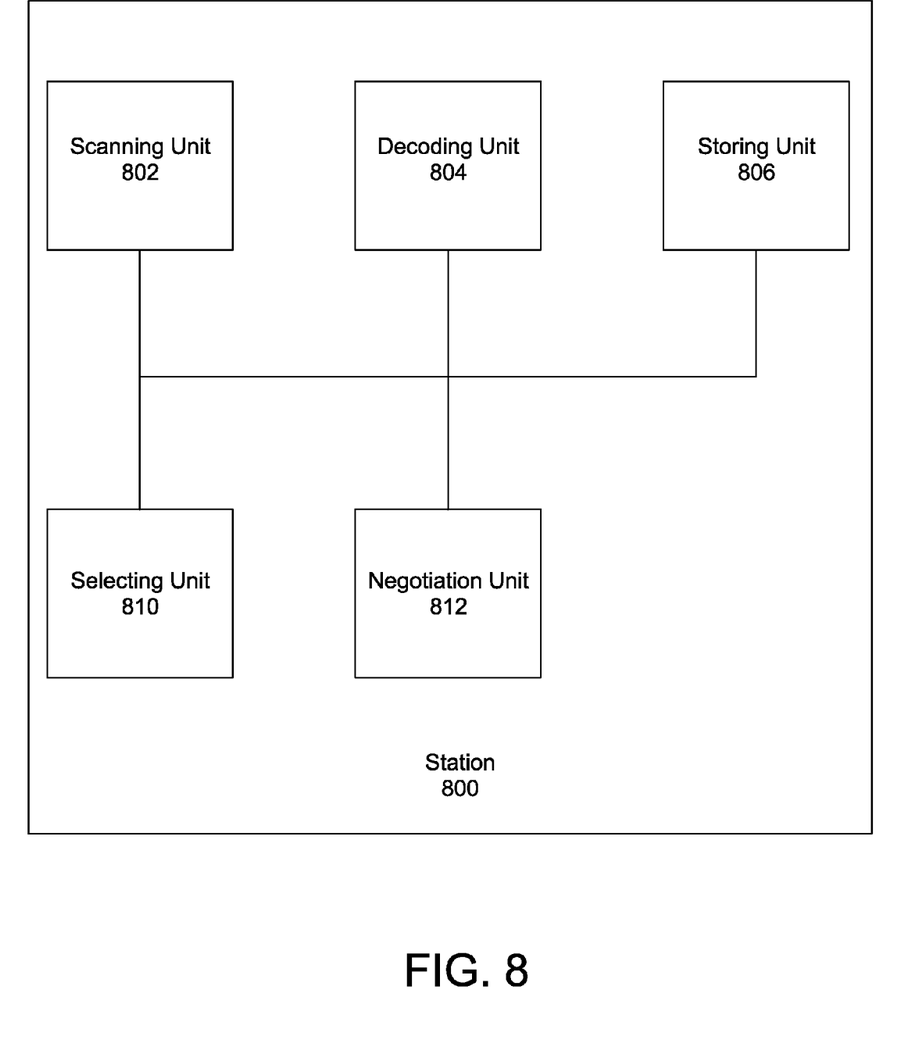
FIG. 8 is a block diagram of a station used in accordance with some embodiments.

FIG. 8 is a block diagram of a station used in accordance with some embodiments. Station 800 is configured to perform resource negotiation on a direct communication link with at least one other station on an OFDMA data channel. Station 800 is the same as any of stations 102 shown in FIG. 1. Station 800 includes a scanning unit 802, a decoding unit 804, a storing unit 806, a selecting unit 810 and a negotiation unit 812. Scanning unit is configured to scan sub-channels on the data channel for base headers included in predefined position in transmissions sent on the sub-channel. Decoding unit 804 configured to decode a base header in at least one selected sub-channel to obtain parameters of a channel reservation. Storing unit is configured to store the parameters obtained from the base header in a channel utilization table. Selecting unit is configured to select a resource on the data channel in at least one of time or frequency that the station has observed to be free using information from the channel utilization table. Negotiation unit is configured to begin a resource negotiation process about the selected resource.

Station 800 may include a random access memory and a programmable memory that are coupled to a processor. The processor may include ports for coupling to wireless network interfaces. The wireless network interfaces can be used to enable station 800 to communicate with other stations in a direct link network. The programmable memory can store operating code (OC) for the processor and code for performing functions associated with station 800. For example, the programmable memory can include computer readable program code components configured to cause execution of a method for performing resource negotiation on a direct communication link with at least one other station on the OFDMA data channel as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of performing resource negotiation in a station implementing a direct communication link with at least one other station on an Orthogonal Frequency-Division Multiple Access (OFDMA) data channel, the method comprising:
    scanning sub-channels on the data channel for base headers included in predefined positions in transmissions sent on the sub-channel;
    decoding a base header in at least one selected sub-channel to obtain parameters of a channel reservation;
    storing the parameters obtained from the base header in a channel utilization table;
    selecting a resource on the data channel in at least one of time or frequency that the station has observed to be free using information from the channel utilization table;
    determining, by a receiving station, if it has scanned the data channel for a predefined minimum scanning time upon receiving a connection request message;
    queuing the connection request message if the scanning is not complete and starting a timer; and
    entering into an iterative resource negotiation process with a transmitting station if the scanning completes before the timer expires, wherein if the iterative resource negotiation process is successful, the receiving station moves a data connection into an active mode and begins transmitting data packets in a negotiated resource.

2. The method of claim 1, wherein a high energy detected in a sub-channel of the data channel during the scanning is used to mark the sub-channel as busy in the channel utilization table.

3. The method of claim 1, wherein a high energy detected in a sub-channel of the data channel during the scanning is used to lower the priority of the sub-channel during the channel reservation process.

4. The method of claim 1, wherein the scanning comprises:
    creating a scan list with sub-channels on the data channel, wherein the sub-channels in the scan list meet a predefined criterion, and
    selecting a sub-channel in the scan list.

5. The method of claim 4, wherein sub-channels that are marked as free in the channel utilization table have increased priority in the scan list.

6. The method of claim 1, wherein the storing comprises at least one of:
    updating reservation information about the sub-channels in the channel utilization table as determined from the parameters obtained from the base header, or
    associating a weight with a status of each sub-channel in the channel utilization table as determined from the parameters obtained from the base header.

7. The method of claim 1, wherein the base headers include at least one of a transmission list or a reception list that provides reservation information as observed by a neighboring station,
    wherein information obtained from at least one of the transmission list or the reception list is used along with information stored in the channel utilization table to determine if a particular sub-channel is reserved.

8. The method of claim 7, wherein contents of the transmission list or the reception list are assigned weights that are used in determining a validity of the reservation information obtained from the transmission list or the reception list.

9. The method of claim 8, wherein the weights are assigned according to at least one of:
- a calculated pathloss between a source and a recipient of the transmission list or the reception list,
- an automatic gain control level of a receiver;
- a fixed weight assigned to each instance of a reservation in the transmission list or the reception list,
- a weight assigned to a reservation in the reception list that is different from a weight assigned to a reservation in the transmission list, or
- a higher weight is assigned to an entry in the transmission list or the reception list for a sub-channel utilization observed by the station than to an entry in the transmission list or the reception list for a sub-channel utilization observation received by the station.

10. The method of claim 7, wherein each entry of the transmission list or the reception list includes at least a list of sub-channels being used in a current frame.

11. The method of claim 1, wherein the parameters transmitted in the base headers include at least one of dimensions of a reservation, a lifetime of an allocation, a periodicity of the allocation, a number of slots in an allocation period, a number and location of frequency sub-channels, addresses for a transmitting station and a receiving station, a flow identifier, or a transmit power for pathloss estimation.

12. The method of claim 1, wherein the selecting comprises allowing a transmitting station to perform in-band resource negotiation with a receiving station to mutually determine resources to be used in communications between the transmitting station and the receiving station.

13. The method of claim 1, wherein in the resource negotiation process a transmitting station:
- waiting for the scanning to be completed upon receiving an upper layer packet,
- selecting an available resource for a data connection,
- entering a backoff phase if no resources are available for the data connection and continues the scanning,
- transmitting a connection request message on the available resource, and
- entering into an iterative negotiation process with a receiving station, wherein if the iterative negotiation process is successful, the transmitting station moves the data connection into an active mode and begins transmitting data packets in a negotiated resource.

14. The method of claim 1, wherein the entering includes in the iterative resource negotiation process the receiving station:
- determining if a described resource is sufficient,
- if the described resource is sufficient, the receiving station waiting until a next allocation instance,
- transmitting a resource reservation message on sub-channels being reserved and waiting for a response in a next resource instance on the sub-channels being reserved,
- if an invalid response is received, the receiving station transmitting a connection release message.

15. The method of claim 1, wherein in the iterative resource negotiation process the receiving station:
- determining if a described resource is sufficient,
- if the described resource is insufficient, the receiving station selecting an alternate resource,
- transmitting a counter proposal message on the alternate resource, waiting for a response to the counter proposal message on the alternate resource and determining if a resource described in a valid reservation request in the response is sufficient,
- if no alternate resource is available, the receiving station transmitting a connection release message.

16. The method of claim 1, wherein the resource negotiation enables a full bi-directional communication session, wherein the resource negotiation defines a proportion of future resources allocated to transmissions by two devices.

* * * * *